United States Patent
Beer et al.

(10) Patent No.: US 7,864,737 B2
(45) Date of Patent: Jan. 4, 2011

(54) METHOD AND DEVICE FOR TRANSMITTING DATA VIA A TRANSMISSION LINK

(75) Inventors: Andreas Beer, Vösendorf (AT); Werner Kozek, Vienna (AT); Bert Schüszler, Vienna (AT)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 120 days.

(21) Appl. No.: 12/090,072

(22) PCT Filed: Aug. 30, 2006

(86) PCT No.: PCT/EP2006/065825
§ 371 (c)(1),
(2), (4) Date: May 22, 2008

(87) PCT Pub. No.: WO2007/057243
PCT Pub. Date: May 24, 2007

(65) Prior Publication Data
US 2008/0247417 A1 Oct. 9, 2008

(30) Foreign Application Priority Data
Oct. 14, 2005 (DE) .................. 10 2005 049 260

(51) Int. Cl.
*H04W 4/00* (2009.01)
*H04J 1/00* (2006.01)
*H04B 17/00* (2006.01)

(52) U.S. Cl. ............. 370/332; 370/480; 455/67.14
(58) Field of Classification Search ........... 370/332, 370/445, 280; 455/67.14
See application file for complete search history.

(56) References Cited

U.S. PATENT DOCUMENTS

| 5,479,447 A | 12/1995 | Chow |
| 5,903,608 A | 5/1999 | Chun |
| 6,052,380 A * | 4/2000 | Bell ..................... 370/445 |

(Continued)

FOREIGN PATENT DOCUMENTS

EP  1489807  12/2004

(Continued)

OTHER PUBLICATIONS

Chow, P.S. et al.: "A Practical Discrete Multitone Transceiver Loading Algorithm for Data Transmission Over Spectrally Shaped Channels", IEEE Transactions on Communications, vol. 43, No. 2/4, part 2, Feb. 1, 1995, pp. 773-775, XP000502585, Piscataway, NJ, US, ISSN:0090-6778, Abstract.

(Continued)

*Primary Examiner*—Ricky Ngo
*Assistant Examiner*—Paul Masur
(74) *Attorney, Agent, or Firm*—Laurence A. Greenberg; Werner H. Stemer; Ralph E. Locher

(57) ABSTRACT

The invention relates, inter alia, to a method in which, by reducing the spectral power density in an underfrequency range (UB) of a transmitting/receiving unit, the fact that the underfrequency range (UB) should not be used to send data is indirectly transmitted. This method is particularly suitable for xDSL processes.

12 Claims, 2 Drawing Sheets

U.S. PATENT DOCUMENTS

| | | | |
|---|---|---|---|
| 6,084,917 A | * | 7/2000 | Kao et al. .................... 375/260 |
| 2003/0048835 A1 | | 3/2003 | Noma |
| 2006/0133467 A1 | * | 6/2006 | Clausen ...................... 375/219 |
| 2006/0256846 A1 | * | 11/2006 | Oksman et al. ............. 375/222 |
| 2007/0058704 A1 | * | 3/2007 | Alford et al. ................ 375/222 |

FOREIGN PATENT DOCUMENTS

| | | |
|---|---|---|
| EP | 1489807 A2 | 12/2004 |
| WO | WO 99/16224 A | 4/1999 |
| WO | WO9916224 | 4/1999 |
| WO | WO 02/33925 A2 | 4/2002 |
| WO | WO0233925 | 4/2002 |

OTHER PUBLICATIONS

Peter S. Chow, et al., "A Practical Discrete Multitone Transceiver Loading Algorithm for Data Transmission over Spectrally Shaped Channels", 9089 IEEE Transactions on Communications 43(1995) Feb./Apr. Nos. 2/4 Pt. II New, York, US.

ITU-T G.994.1 Series G: Transmission Systems and Media, Digital Systems and Networks Digital sections and digital line system—Access networks Handshake procedures for digital subscriber line (DSL) transceivers, Feb. 2007.

ITU-T G.992.1, Series G: Transmission Systems and Media, Digital Systems and Networks Digital transmission systems—Digital sections and digital line system—Access networks Asymmetric digital subscriber line (ADSL) transceivers, Jun. 1999.

ETSI-TS 101 270-1 V1.3.1 (Jul. 2003) Transmission and Multiplexing (TM); Access transmission systems on metallic access cables; Very high speed Digital Subscriber Line (VDSL); Part 1: Functional requirements.

ETSI TS 101 270-2 V.1.2.1 (Jul. 2003) Transmission and Multiplexing (TM); Access transmission systems on metallic access cables; Very High Speed Digital Subscriber Line (VDSL); Part 2: Transceiver specification.

* cited by examiner

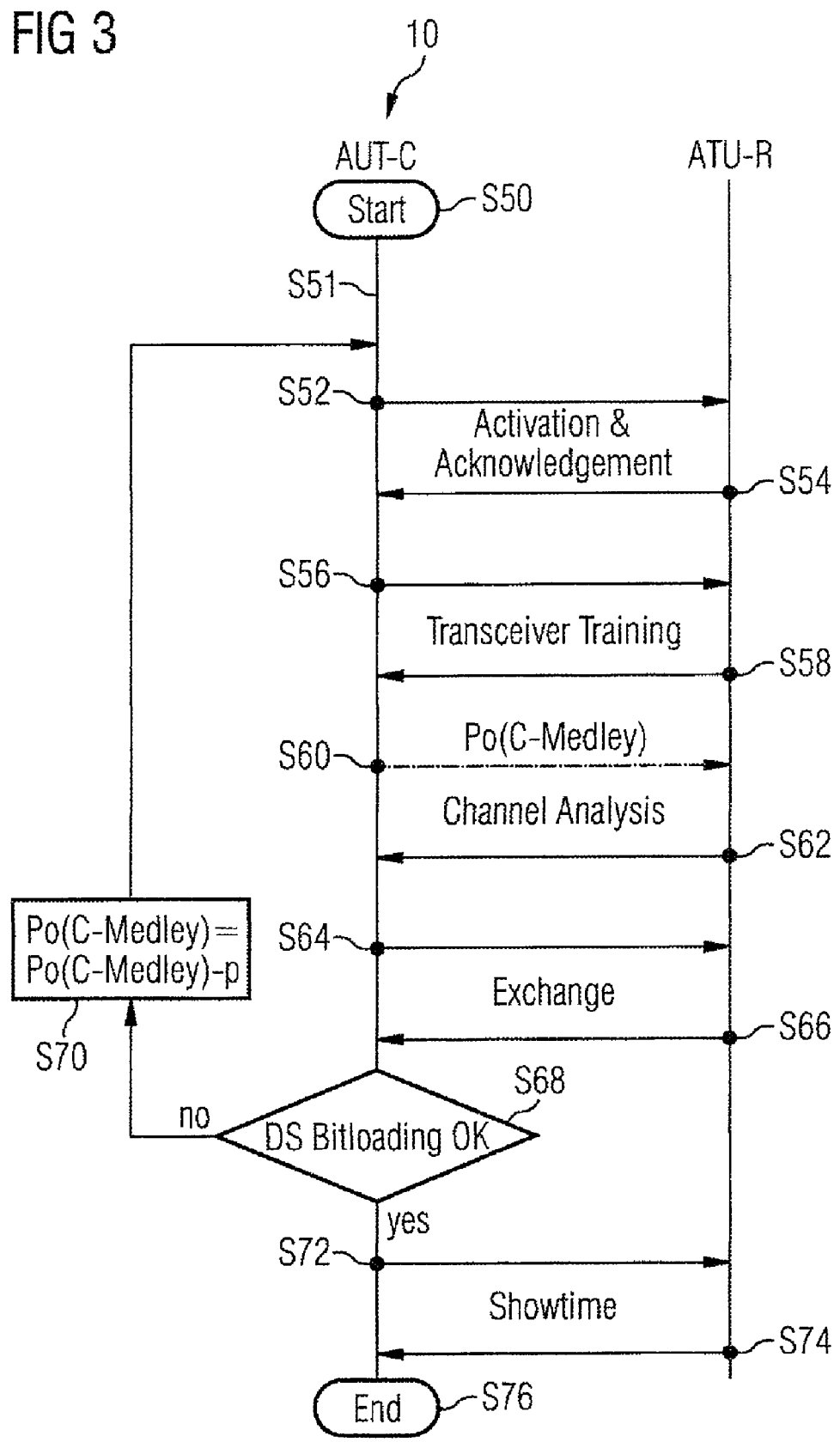

METHOD AND DEVICE FOR TRANSMITTING DATA VIA A TRANSMISSION LINK

CLAIM FOR PRIORITY

This application is a national stage application of PCT/EP2006/065825, filed Aug. 30, 2006, which claims the benefit of priority to German Application No. 10 2005 049 260.6, filed Oct. 14, 2005, the contents of which hereby incorporated by reference.

TECHNICAL FIELD OF THE INVENTION

The invention relates to a method for transmitting data via a transmission link, particularly via a subscriber transmission link and particularly in an initialization phase which precedes the transmission of useful data.

BACKGROUND OF THE INVENTION

A transmission link is, for example, a two-wire copper line as used in xDSL (x digital subscriber line) methods, particularly in ADSL (asymmetrical digital subscriber line) methods and in VDSL (very high speed digital subscriber line) methods. Other transmission links, for example radio transmission links, are also used, see, for example, the applications according to a so-called WiMAX (worldwide interoperability for microwave access) method, the application in a WLAN (wireless local area network) or in a UMTS (universal mobile telecommunication system).

Although transmitting/receiving devices based on the methods are already used in their millions, the invention seeks to improve the relevant devices and methods, particularly with regard to the achievable ranges or the achievable transmission rates and transmission quality, respectively. In particular, it is to be ensured that the technical effects are achieved even in transmitting/receiving devices in which no explicit exception of frequency ranges is provided for the transmitting.

SUMMARY OF THE INVENTION

The invention relates to a method for transmitting data via a transmission link, particularly via a subscriber transmission link and particularly in an initialization phase which precedes the transmission of useful data. In particular, the invention relates to: the use of ADSL (asymmetrical digital subscriber line) methods, e.g. according to the ITU-T (International Telecommunication Union—Telecommunication Standardization Sector) G.992.x, ANSI (American National Standards Institute) T1.413, or ETSI (European Telecommunications standards Institute) RTS TM-06006, and VDSL (very high digital subscriber line) method, for example according to the ETSI TS101 270, ITU-T 993.x, or ANSI T1.424 standards.

The invention is based on the fact that certain frequency ranges of a known frequency range may need to be accepted from a transmission in order to guarantee a high data transmission rate or a high data transmission quality, respectively. Accepting the frequency ranges from transmitting is required, for example, if disturbances are present in these ranges which come from other transmission links. On the other hand, the acceptance of the frequency ranges may also be required, however, in order to avoid or to reduce disturbances of other transmission links. If an explicit transmission of the frequency ranges to be accepted to a transmitting/receiving device at the subscriber side or network side is not possible, an implicit transmission can still be achieved if the frequency ranges to be accepted are represented by the controlling transmitting or receiving device to the transmitting/receiving device to be controlled as ranges in which the transmission link has reduced or poor transmission characteristics. In this case, the transmitting of the receiving device to be controlled automatically accepts these frequency ranges from the transmission during the transmitting.

In one embodiment of the invention, there is a method including predetermining a reference sequence and a reference method for transmitting the reference sequence, wherein a main frequency range is provided for transmitting the reference sequence, which, for example is more than 100 kHz wide, predetermining at least one underfrequency range of the main frequency range which is not to be used during a transmission of useful data via a transmission link, generating a first test signal or training signal on the basis of the reference sequence and the predetermined method, wherein, however, in the first underfrequency range, in deviation from the predetermined reference sequence or in deviation from the predetermined reference method, a reduction of the power spectral density of a first signal component is forced, transmitting the first test signal via the transmission link from a transmitter to a receiver, wherein the transmission link by using the received first test signal and by assuming, that the first test signal has been genereated from the reference sequence and by using the reference method, and dependent upon the transmission link, in the first underfrequency range, allocating of a first number of bits to the first underfrequency range, wherein the first number specifies the bits which can be transmitted in the first underfrequency range.

Such reference sequences and reference methods are specified, for example, in the ITU-T G.992.1 standard (06.99), chapter 10 (Initialization). However, there are also other standards in which reference sequences and reference methods are mentioned. Forcing the reduction of the power spectral density of the first signal component can be achieved in a multitone signal, for example, by transmitting no bits in selected tone signals of the multitone signal. As an alternative, an analog filtering device can also be used in order to reduce the power spectral density.

In principle, it is possible that the transmitting or receiving device to be controlled is constructed in such a manner that it is possible to perform an abrupt incremental reduction in the density power spectral density, for example if very high-quality and elaborate optimization algorithms or optimization methods are used in the transmitting/receiving device to be controlled. In such a case, the power spectral density can be reduced to the value of zero in a single step, apart from noise signals.

However, there is a trend towards transmitting/receiving devices of very simple configuration in which optimization methods are implemented which no longer operate correctly with abrupt changes in the power spectral density.

In another embodiment of the invention is therefore influenced by an iterative and gradual reduction of the spectral power component in a frequency range to be accepted from the transmission provides for an implicit transmission of the frequency range to be accepted to the transmitting/receiving device to be controlled even if optimization methods are implemented there which would not tolerate an abrupt change in the power spectral density in a particular frequency range.

According to this embodiment, the power spectral density is reduced iteratively until the receiver reports a value of zero which specifies that no further bits are allocated to the underfrequency range, In this case, the power spectral density is in each case reduced with respect to the same reference point or the same reference frequency of the underfrequency range or, respectively, also in the entire underfrequency range.

In another embodiment of the invention, an adaptive filtering unit is used for characterizing the transmission link, wherein the filter coefficients of the filtering unit characterize the transmission link. Suitable functions for characterizing the transmission link are:

the impulse response in the time domain,
the step response in the time domain,
the transfer function, i.e. the Fourier transform of the impulse response, in the frequency domain,
the Fourier transform of the step response in the frequency domain,
an inverse step response, or
another characterization function which allows an output signal sequence to be calculated unambiguously for an arbitrary input signal sequence.

For example, the adaptive filtering unit receives reference sequence as input signal. It is the aim of adapting the adaptive filtering unit to generate at the output of the adaptor filtering unit a signal which resembles the received first test signal. In this case, the filter coefficients of the filtering unit specify the samples of the impulse response of the transmission link. From the impulse response, the transfer function or the frequency response, respectively, could be determined by a Fourier transformation. Using the frequency response, determinations can then be made how many bits are to be transmitted in which frequency range. To transmit a number of bits in one carrier frequency, a PAM-PSK (pulse amplitude modulation—phase shift keying) or QAM (quadrature amplitude modulation), for example, is suitable. However, other modulation methods are also suitable.

In one aspect according to the invention, the first test signal has in a second underfrequency range of the same width, which differs from the first underfrequency range, a greater power spectral density than in the first underfrequency range. For example, the power density is greater by at least 30 percent. In other embodiments, there are a number of mutually separated underranges within the main frequency range, which are to be accepted from the transmission.

In another aspect according to the invention, the test signal is a multitone signal, wherein the underfrequency range contains only one tone signal or a number of tone signals, preferably at least five successive tone signals. The tone signals are also designated as so-called bins and are spaced apart, for example, by 4.3125 kHz. Including a number of successive tone signals provides for a particularly efficient reduction of disturbances or avoidance of disturbances.

In still another aspect, during the transmission of the useful data, more than one bit are transmitted in at least one tone signal, preferably by means of QAM (quadrature amplitude modulation). The data transmission rate can thus be increased simply and efficiently.

In yet another aspect, the test signal is a bit sequence generated by means of a random number generator which provides for a particularly quick adaptation of a filtering unit. Thus, according to the ADSL standard, a sequence C-REVERB1 to C-REVERB4 or a sequence C-MEDLEY is used, for example.

In another aspect, the power spectral density is reduced in the first underfrequency range by dividing bit values of the reference sequence by a divisor, particularly by division by two, by four etc. i.e. by multiples of two. Such a procedure can be achieved, in a simple manner, for example by means of so-called bit shifting.

In another aspect, the useful data are transmitted in accordance with an xDSL method, particularly on a two-wire copper line. This makes it possible to use an existing infrastructure for a wide-band data transmission.

In still another aspect, the method is carried out by using a device which is suitable for an ADSL2 or ADSL2+ method. However, there is at the opposite end a subscriber unit which only operates in accordance with ADSL1. Thus, it is possible to select certain frequency ranges for the transmission even in an ADSL1 method. Without the invention, such a selection would only be possible for both directions of the data transmission when using an ADSL2 method or an ADSL method developed even further.

Another embodiment of the invention also relates to a device which, in particular, is used for carrying out the method according to the invention

BRIEF DESCRIPTION OF THE DRAWINGS

In the text which follows, the invention will be explained by means of the attached drawings, in which:

FIG. 3 shows method steps for initializing a line unit at the subscriber side.

DETAILED DESCRIPTION OF THE INVENTION

Figure 1:
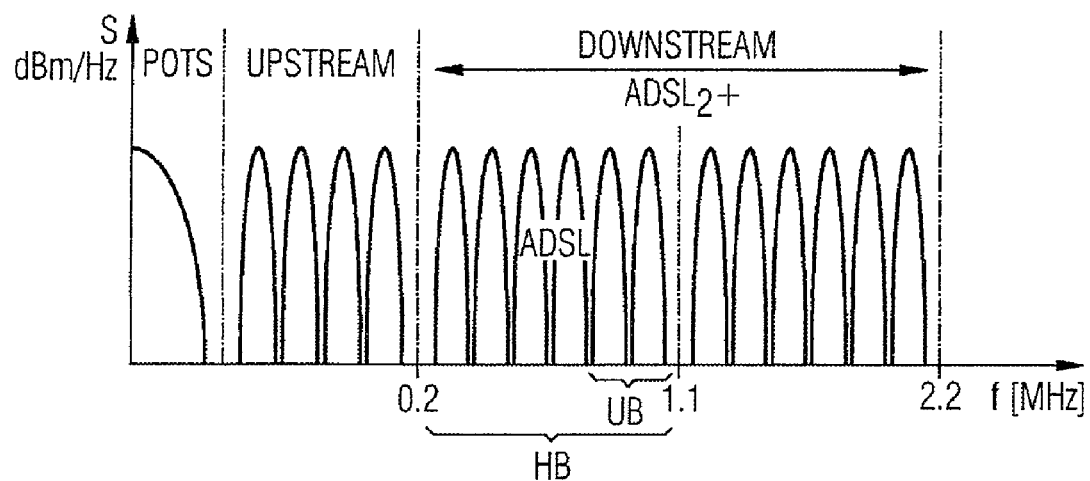
FIG. 1 shows a frequency range which is used in an ADSL method.

FIG. 1 shows a system of coordinates on the x axis of which the frequency is plotted in megahertz. On the y axis of the system of coordinates, and contrast, the spectral power density is plotted, for example in dBm/Hz. In a lower frequency range, for example in the range up to 6 kHz or, in the case of ISDN (integrated services digital network) up to 150 MHz, conventional telephone data are transmitted, for example in analog or in digital form.

In a frequency range of, for example 20 kHz is set to 0.2 MHz (megahertz), data are transmitted from the subscriber to a network node with the aid of a multitone signal. This direction is also called the upstream direction. In a further frequency range of for example 0.2 MHz to 1.1 MHz, data are transmitted from the network node to the subscriber, also with the aid of a multitone signal. This frequency range is also called the downstream frequency range. In the text which follows, this downstream frequency range is a main frequency range HB from which an underfrequency range UB is to be excepted. In an ADSL2+ method, the downstream frequency range extends, for example, from 0.2 MHz to 2.2 MHz.

In other exemplary embodiments, the boundaries between the frequency ranges are located at other places. Overlaps of the frequency ranges are also permissible in certain methods.

In the exemplary embodiment, it is assumed that the two tone signals having the highest carrier frequencies are not to be used for transmitting data in the downstream frequency range HB, for example in order to prevent disturbances by other transmissions in the cable bunch. The two tone signals to be suppressed are located in an underfrequency range UB at the upper end of the main frequency range HB. In other exemplary embodiments, a number of part-ranges are to be suppressed in the main frequency range HB, i.e. particularly part-ranges between which there are ranges in which an upstream transmission takes place.

Figure 2:
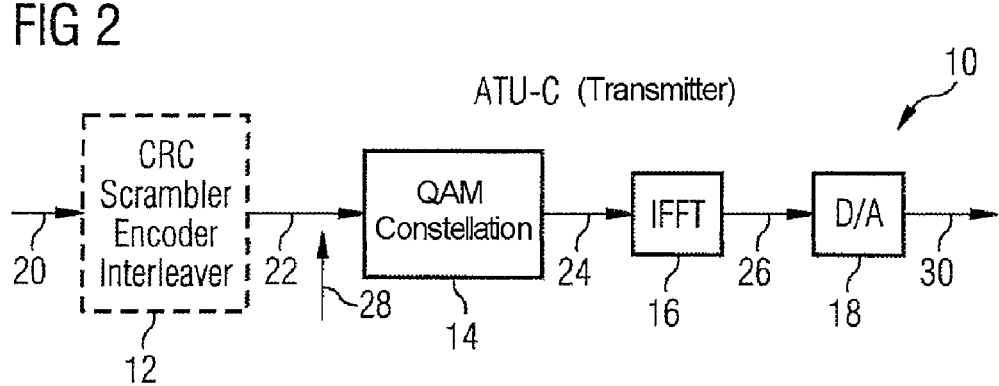
FIG. 2 shows the structure of a line unit at the network side.

FIG. 2 shows a line unit 10 at the network side and which is also called ATU-C (ADSL transceiver unit central office end). The line unit 10 is located, for example, in a central office of a circuit-switch telephone network or in a network node of a data packet transmission network, e.g. the Internet.

The line unit 10 includes:
- units 12 preceding the units shown in FIG. 2, for example an error coding unit (cyclic redundancy check), a so-called scrambler, encoder units, e.g. a Reed-Solomon encoder or a trellis encoder and an interleaver,
- a QAM (quadrature amplitude modulation) which, for example, is implemented by a table, according to which groups of bits are in each case allocated to a real component and to an imaginary component,
- an IFFT (inverse fast Fourier transformation) unit for carrying out an inverse fast Fourier transformation, and
- a digital/analog converter.

Arrows 20 to 26 show the dataflow in the line unit 10. Bits to be transmitted are processed by the preceding units 12 during the transmission of useful data. When the method according to the invention is performed, the preceding units 12 are preferably switched off, however. A bit sequence to be transmitted, as shown by an arrow 22, is thus input directly into the QAM unit, but values are first multiplied by a damping factor, as indicated by an arrow 28, in order to suppress certain frequency ranges.

As indicated by an arrow 24, the bit sequence output from the QAM unit 14 is then subjected to an inverse Fourier transformation in the IFFT unit 16. The digital data output by the unit 16 are converted in the digital/analog converter 18 into an analog output signal which is then transmitted via a connecting line 30 to a receiving unit ATU-R of a subscriber TlnA.

The line unit 10 shown in FIG. 2 can be implemented by using a processor. As an alternative, however, the line unit 10 is also implemented as an electronic circuit without processor.

FIG. 3 shows method steps which are performed during the initializing of the line unit 10 and of a receiving unit ATU-R at the subscriber end. The method begins in a method step S50. In a method step S51 following the method step S50, a predefining unit predefines the underfrequency range UB as frequency range to be accepted during the transmission, for example in order to reduce crosstalk between mutually adjacent pairs of wires of a bunch of wires.

In a method step S52, signaling is carried out between the line unit 10 and the receiving unit ATU-R at the subscriber end. The receiving unit of the subscriber answers in a method step S54. With respect to method steps S52 and S54, reference is made, for example, to the ITU-T standard G 992.1 (06/99), section 10.2 and to the ITU-T standard G 994.1.

In a following method step S56, the training of at least one adaptive filtering unit begins in the receiving unit ATU-R at the subscriber end. In a method step S58, training of at least one adaptive filtering unit is carried out in the line unit 10. With respect to method steps S56 and S58, reference is also made, for example, to ITU-T standard G 992.1 (06/99), chapter 10.

In the first exemplary embodiment, after conclusion of the training, in a method step S60, a so-called channel analysis is begun in which the transmission channel from the line unit 10 to the receiving unit ATU-R is to be characterized. In deviation from the ITU-T standard G.992.1, a signal is used here in which only a reduced signal power in comparison with the remaining frequency ranges is used for transmission in the underfrequency range UB. The receiving unit at the subscriber end assumes, however, that the C-MEDLEY signal has been transmitted in accordance with the ITU-T standard G.992.1 and thus attributes the reduction in signal range to an impairment of the transmission link. Dependent upon the transmission characteristics determined by the receiving unit ATU-R for the frequency range UB, a reduced number of bits are allocated to this frequency range, in comparison with an undamped signal generation in the underfrequency range UB.

In a method step S62, a test signal is transmitted to the line unit 10 by the receiving unit ATU-R at the subscriber end whereupon the channel characteristic of the transmission channel is determined in the opposite direction in the transmitting unit 10, for example the impulse response, by using an adaptive filtering unit. This process occurs, for example in accordance with the ITU-T standard G 992.1.1 (06/99), chapter 10.7.

In a subsequent method step S64 and in a method step S66, the line unit 10 and the receiving unit ATU-R exchange the results determined in the channel analysis, particularly the allocation of bits to the individual tone signals. Reference is also made to, for example, the ITU-T standard G.992.1 (06/99), chapter 10.8 and chapter 10.9 with respect to method steps S64 and S66.

In a method step S68, a check is made whether bits have been allocated to tone signals or to a tone signal in the underfrequency range UB for the direction of transmission from the receiving unit ATU-R to the line unit 10. In this case, the allocation is considered to be not yet sufficient and the method is directly continued in a subsequent method step S70.

In method step S70, the power is reduced in the frequency range UB of the C-MEDLEY test signal, for example by 1 dB. Following this, the method is continued in method step S72. The method is now in a method loop of method steps S52 to S70. The method loop is continued until it is found in method step S68 that no further bits have been allocated to the underfrequency range UB. In this case, the allocation of bits to the underfrequency range UB is in order and method step S68 is directly followed by a method step S72. In method step S72 and in a method step S74, useful data are exchanged between the line unit 10 and the receiving unit ATU-R, no useful data being transmitted in the underfrequency range UB. After the transmitting of the useful data, the method is ended in a method step S76. The useful data are, for example, voice data, music data, image data, video data, program data etc.

In another exemplary embodiment, the influencing of a training signal predetermined in the standard is already carried out in method step S56, for example with respect to the signals C-REVERB1, C-REVERB2, C-REVERB3 or C-REVERB4 mentioned in the standard G.992.1 (06/99), chapter 10.4. The initialization time can be shortened by this measure.

In summary, it implies that, among other things, a modified standard-compatible initialization method for spectral optimization in xDSL has been specified. In this context, it has been assumed that crosstalk is one of the most important problems for the further development of broadband line technology. Changes in the transmitting spectrum allow crosstalk to be counteracted but instabilities may occur in the modem training at the subscriber end.

In the ADSL1-standardized initialization phase, a fast convergence of all adaptive filters involved is achieved at the receiver by sending out well-defined transmit signals, mentioning, in particular, C-MEDLEY and C-REVERB. The LMS (least mean square)-like algorithms usually implemented are intended for largely white transmit signals, i.e. for transmit signals which have a uniform spectral power over a wide frequency range. For this reason, many algorithms become numerically unstable in the case of essentially spectral restrictions. This problem could only be solved at the receiving end by elaborate RLS (recursive least square)-like algorithms. However, it would still be necessary to implicitly transmit to the modem at the receiving end which frequency range is to be accepted from the data transmission.

The solutions proposed are based on a modification at the central office end or network node end during the training, for example in ADSL training, and do not presuppose any change in the CPE (customer premises equipment) modem firmware. As a basic concept, the restriction of the downstream transmit spectrum must be represented to the CPE modem as power attenuation. A high-level CPE adaptivity logic at the CO end (central office) ensures that the CPE modem responds as desired. To ensure the convergence of the adaptive (downstream) receive filter FEQ (frequency domain equalizer), TEQ (time domain equalizer), EC (echo canceller), transmission first occurs with full bandwidth, for example during the "transceiver training" phase, whereas in the "channel analysis" phase (for example C-MEDLEY transmit signal), the level is only progressively lowered in the unwanted downstream range, i.e. from the white noise, a so-called colored noise is generated. If the CPE modem still allocates bits in the unwanted range, the levels of C-MEDLEY are again lowered. The method leads to success especially if the restriction in downstream bandwidth allows the required bit rate in the so-called water filling, i.e. the allocation of a number of bits to a tone signal. However, these conditions can be ensured by higher-level control systems.

As has been explained by means of the figures, a modification, which is shown by the arrow 28 in FIG. 2, is performed, for example, in method step S60. In FIG. 3, the Po (C-MEDLEY) stands for the proportion of the power of the downstream MEDLEY signal sent out by the CO which lies in the frequency range to be suppressed. "p" stands for the incremental power reduction. A suitable value for p is 1 dB (or also more than 1 dB but then in dependence on the bit allocation in the unwanted underfrequency range UB reported back). For example, the value p lies within a range of from 0.5 dB to 2 dB, particularly within the range of from 0.8 dB to 1.2 dB.

The procedure explained can also be applied in other transmission methods, particularly in the ADSL2 or ADSL2(+) line cards used in the future since, as a rule, CPE modems will still be restricted to ADSL1 in the medium term.

In other exemplary embodiments, the methods explained here are also carried out for the reverse direction of transmission. For example, if a more recent ADSL modem, which, for example, operates in accordance with ADSL2 or ADSL2+, encounters an older line card or line unit at a network end which, for example, operates in accordance with ADSL1.

Among other things, a method has been explained in which, by reducing the spectral power density in an underfrequency range UB, the fact is indirectly transmitted to a transmitting/receiving unit that the underfrequency range is not to be used for transmitting data. This method is particularly suitable for xDSL methods.

The invention claimed is:

1. A method for transmitting data via a subscriber transmission link, comprising:
predetermining a reference sequence and a reference method for transmitting the reference sequence, wherein a main frequency range is provided for transmitting the reference sequence;
predetermining in the main frequency range at least one underfrequency range which is not to be used during a transmission of useful data via a transmission link;
in a transmitter generating a test signal having a power spectral density based on the reference sequence and the reference method;
reducing the power spectral density of a component of the test signal in the underfrequency range, in deviation from the reference sequence or in deviation from the reference method;
transmitting the test signal via the transmission link from the transmitter to a receiver;
in the receiver characterizing the transmission link by using the received test signal and by assuming, that the test signal has been generated from the reference sequence and by using the reference method;
allocating to the underfrequency range a number of bits which can be transmitted in the underfrequency range depending on the characterization of the transmission link in the underfrequency range;
transmitting from the receiver to the transmitter a value specifying the allocated number of bits;
iteratively reducing the power spectral density until the value transmitted by the receiver is zero.

2. The method as claimed in claim 1, wherein the first number is greater than zero, and further comprising:
transmitting a value which specifies the allocated first number of bits from the receiver to the transmitter;
generating a second test signal which includes a second signal component in the first underfrequency range, the power spectral density of which is less than the power spectral density of the first signal components;
transmitting the second test signal via the transmission link from the transmitter to the receiver;
recharacterizing the transmission link by using the received second test signal and by assuming that the second test signal has been generated from the reference sequence and by using the reference method;
allocating to the first underfrequency range a second number of bits which can be transmitted in the first underfrequency range dependent on the recharacterization of the transmission link in the first underfrequency range;
transmitting from the receiver to the transmitter a value which specifies the allocated second number of bits; and
continuing the reducing of the power of the signal component with a second number of greater than zero or ending the method if the second number is equal to zero.

3. The method as claimed in claim 1, wherein the power spectral density is reduced abruptly to the value of zero of iteratively apart from a noise component.

4. The method as claimed in claim 1, wherein an adaptive filtering unit is used for characterizing the transmission link, wherein the filter coefficients of the filtering unit characterize the transmission link.

5. The method as claimed in claim 1, wherein the first test signal has in a second underfrequency range, which differs from the first underfrequency range, of the main frequency range a greater power spectral density than in the first underfrequency range.

6. The method as claimed in claim 1, wherein the test signal is a multitone signal, and
the first underfrequency range includes one tone signal or a number of tone signals, preferably at least five tone signals.

7. The method as claimed in claim 6, wherein during the transmission of the useful data, more than one bit is transmitted in at least one tone signal.

8. The method as claimed in claim 1, wherein the test signal includes a bit sequence generated by means of a random number generator.

9. The method as claimed in claim 1, wherein the power spectral density is reduced by dividing a bit value to be transmitted in the first underfrequency range or a divisor.

10. The method as claimed in claim 1, wherein subsequently useful data are transmitted in accordance with an xDSL method.

11. The method as claimed in claim 10, wherein the method is performed in a device which transmits data according to an ADSL1 method in a first operating mode and which transmits data in accordance with ADSL2 or ADSL2+, respectively, in a second operating mode.

12. A device for transmitting data via a transmission link, comprising:
   a predetermining unit which predetermines in a main frequency range at least one first underfrequency range which is not to be used during a transmission of useful data via a transmission link;
   a training signal generating unit which, based on a predetermined reference sequence and a predetermined method, generates a first test signal, wherein in the first underfrequency range, in deviation from the predetermined reference sequence or in deviation from the predetermined reference method, a reduction of a power spectral density of a first signal component of the test signal in the underfrequency range is forced; and
   a transmitting unit which transmits the first test signal to a receiver via a transmission link;
   wherein the power spectral density is iteratively reduced until a value transmitted by the receiver is zero; and
   wherein the transmitting unit receives, from the receiver, a value specifying a number of bits to be transmitted in the first underfrequency range, and the number of bits depends on a characterization of the transmission link.

* * * * *